May 15, 1956  A. G. JANOS  2,745,173
METHOD OF THERMAL INSULATION
Filed Aug. 8, 1952  2 Sheets-Sheet 1

Inventor:
Alfred G. Janos,
by William G. Edwards,
His Attorney.

May 15, 1956     A. G. JANOS     2,745,173
METHOD OF THERMAL INSULATION
Filed Aug. 8, 1952     2 Sheets-Sheet 2

Inventor:
Alfred G. Janos,
by *William B. Edwards, Jr.*
His Attorney.

United States Patent Office 2,745,173
Patented May 15, 1956

2,745,173

METHOD OF THERMAL INSULATION

Alfred G. Janos, Erie, Pa., assignor to General Electric Company, a corporation of New York Application August 8, 1952, Serial No. 303,324

2 Claims. (Cl. 29—455)

My invention relates to thermal insulation and to methods of manufacture thereof.

The present application is a continuation in part of my copending application Serial No. 236,971, filed July 16, 1951, now abandoned, and assigned to the assignee of the present application.

The present invention is an improvement over the invention of the copending application of Herbert M. Strong and Francis P. Bundy, Serial No. 236,788, filed July 14, 1951, and assigned to the same assignee as the present invention, which invention was made by said Herbert M. Strong and Francis P. Bundy prior to the present invention. Therefore, it is not intended to claim herein anything shown or described in said Strong and Bundy application, which is to be regarded as prior art with respect to the present application.

Batts of thermal insulation may comprise a plurality of glass filaments. Such batts, as presently employed, are usually of substantial thickness and resiliency. It is desirable for some purposes to compress such batts to a much smaller thickness and greater density. For example, as set forth in the above-mentioned copending application of Herbert M. Strong and Francis P. Bundy, Serial No. 236,788, filed July 14, 1951, vacuum insulation, that is insulation employing an evacuated space, may be made using a filler material comprising a plurality of glass filaments arranged in particular manner. Since the filler material must support the spaced walls against atmospheric pressure, it necessarily is compressed substantially in use compared to its condition when not so subjected to a differential pressure of this amount. If a batt of such filler material in its uncompressed state is assembled between the walls and then the walls are pushed together compressing the batt, glass filaments may find their way between the edges of the walls to be sealed, impairing the weld and preventing the securing or maintenance of a satisfactory low pressure between the walls. By my invention, the insulating filler material is compressed before assembly and is caused to retain its compressed form. Since the filler material is precompressed and preformed approximately to the thickness it retains during use in vacuum insulated structures, it may then be assembled between the walls with a greatly reduced amount of movement of the walls toward each other to their sealing position. Moreover even aside from the effect of compression of the batt, by my invention the likelihood of loose filaments extending beyond the side walls of the batt is reduced. Accordingly, the possibility of glass filaments finding their way between the walls in a sealing area with the resultant possibility of imperfect welds is minimized. There may be combined with this process of preforming the batt of filler material an arrangement for shaping the surfaces of the batt to provide passages for facilitating evacuation of the sealed envelope surrounding the batt.

It is an object of my invention to provide an improved thermal insulated structure.

It is another object of my invention to provide an improved method of making a filler material for use with insulated structures.

It is a further object of my invention to provide an improved method of making a filler material, particularly suitable for insulated structures employing an evacuated space.

It is still another object of my invention to provide an improved method of making a filler material which facilitates evacuation of the envelope surrounding the filler material.

Further objects and advantages of my invention will become apparent as the following description proceeds and the features of novelty which characterize my invention will be pointed out with particularity in the claims annexed to and forming part of this specification.

In carrying out the objects of my invention, a filler material is subjected to particular conditions of pressure and temperature to precompress and preform the material approximately to thickness necessary for the use contemplated. Additionally a material may be preformed to provide passages for facilitating evacuation.

For a better understanding of my invention, reference may be had to the accompanying drawings in which.

Figure 1:
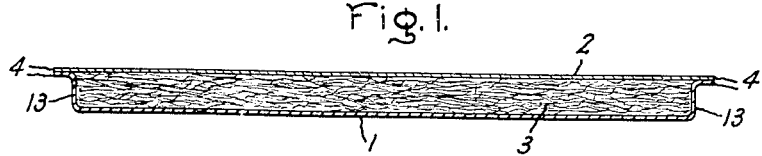
Fig. 1 shows a sectional view of a form of insulating structure employing a filler material treated in accordance with my invention.

In making vacuum insulated structures or panels of the type illustrated in Fig. 1, one wall 1 of a material of relatively high heat conductivity, such as low carbon steel, may be employed. A second wall 2 of a material of relatively low heat conductivity, for example stainless steel, or alternatively of relatively thin low carbon steel is employed. This second wall 2 includes a flat central portion 2a and a rim 26 extending toward the wall 1, thereby providing a pan-shaped wall of predetermined depth. The space between the walls 1 and 2 is filled with a filler material 3 which comprises a plurality of elongated glass filaments lying in a plurality of parallel planes and randomly oriented in these planes in accordance with the invention described and claimed in the aforementioned copending application of Herbert M. Strong and Francis P. Bundy. While for simplicity of description the filaments are referred to in this specification as "glass," this term is intended to embrace all filamentous materials having similar characteristics with respect to hardness, low thermal conductivity, etc. For example, quartz, rock wool slag and such materials may be employed. The walls 1 and 2 are sealed at the edges 4 in any suitable manner, as by welding, and the space between the walls is evacuated to a relatively low pressure. It will be appreciated that in order to secure a low pressure, for example below a pressure of the order of 100 microns of mercury, and to maintain this low pressure over a prolonged period of time, it is essential that a perfect weld be secured at the sealing edges 4 of the plates 1 and 2.

Figure 2:
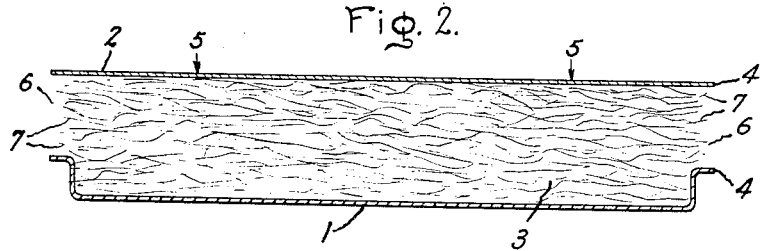
Fig. 2 illustrates an insulating panel, similar to that shown in Fig. 1, in an intermediate stage of manufacture where the precompressed and preformed filler material of my invention is not employed.

The securing of this perfect weld at the sealing edges poses a problem where a filler material composed of a plurality of glass filaments is employed. Referring to Fig. 2, it can be seen that if a batt of filler material 3 is placed in its uncompressed state adjacent the wall 1 and then pressure is exerted against this batt of filler material by a force applicated to the wall 2, as indicated at 5, the filler material will be compressed. Filler material of this type normally has the ends of some glass filaments extending beyond the side walls of the batt, these loose ends extending into the region 6. In addition to this characteristic of the filler material, there is no definite obstacle to its lateral movement in the region 6. Hence there may be some bowing of the sides of the batt of filler material into the region 6; moreover, the compressing of the filler material causes some of the relatively loose filaments at the edges to be twisted and displaced into the region 6. As a result, some filaments, indicated at 7, tend to move into the region between the sealing edges 4. Since the filler material in use must support the walls 1 and 2 against a differential pressure of approximately one atmosphere resulting from the external atmospheric pressure, it will be appreciated that a substantial reduction in thickness of the batt of the filler material results. By way of example, a batt of filamentous glass filler material approximately 4" in thickness may be compressed to about ½" in thickness in the state shown in Fig. 1; that is, the initial thickness of the filler material greatly exceeds the depth of the wall 2, which corresponds to the final thickness of the compressed filler material. Hence the sealing edges 4 of the plates 1 and 2 would be spaced approximately 3½" before the force is applied to the plate 2. With the large number of glass filaments involved, and with the necessity of forcing the batt of filler material downwardly approximately 3½" into the space within the wall 1, it is apparent that there is a great likelihood, particularly under mass production manufacturing conditions, that at least some of the glass filaments may find their way into the region 6 and therefore between the sealing edges 4 as the sealing edges are brought into engagement. The presence of such glass filaments has a deleterious effect upon the condition of the welds secured at the contacting edges of the walls 1 and 2. It is, therefore, quite difficult to secure a perfect weld between the walls 1 and 2 and, therefore, to secure a satisfactory seal which will enable maintenance of the necessary low pressure over a prolonged period of time.

Figure 3:
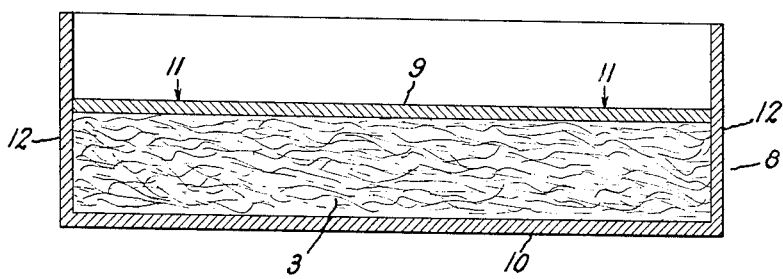
Fig. 3 illustrates diagrammatically an arrangement for making the filler material in accordance with my invention.

In accordance with my invention, this difficulty is obviated by precompressing and preforming the batt of filler material to approximately the thickness which it necessarily must assume in the finished structure to properly support the walls against the differential pressure of approximately one atmosphere. An arrangement for carrying out this method, particularly applicable to cases where it is desired to form the batt approximately to the lateral dimensions of the panel in which it is to be employed, is shown diagrammatically in Fig. 3. The batt of filler material 3 in its uncompressed state is placed within a container 8 and a flat plate 9, having the same dimensions as the interior of the container 8, is placed on the top surface of the filler material 3. The glass filaments of which the filler material 3 is composed are randomly oriented in a plurality of parallel planes in accordance with the invention described and claimed in the aforementioned copending application of Strong and Bundy. In carrying out the method of my invention, the batt of filler material is placed within the container so that these planes in which the glass filaments are oriented are parallel to the plate 9 and to the bottom 10 of the container 8. With the filler material arranged as shown in Fig. 3, a compressive force at least of the order of one atmosphere is applied to the upper surface of the plate 9, as indicated at 1. Like the force applied at 5 in the arrangement shown in Fig. 2, this effects a compression of the filler material 3. However, in the arrangement shown in Fig. 3, the side walls 12 of the container 8 prevent any lateral movement of the filaments of the filler material 3 and hence the entire filler material in its compressed state is retained within the confines provided by the side walls 12. The walls 12 are arranged to correspond to the rim 26 of the wall 1 employed in the insulated structure with which the compressed filler material is to be used. Accordingly, the possibility of glass filaments in the region between the sealing edges 4 of the plates 1 and 2 in the final assembly is minimized. The pressure employed for compressing the filler material is chosen so as to reduce the thickness of the original batt to approximately the final thickness to be employed in the panel structure. Depending upon the original thickness of the filler material employed and the final thickness desired, this pressure may, of course, be substantially greater than one atmosphere. However, it is necessary that a pressure substantially as great as one atmosphere be employed as a minimum if the batt is to be successfully compressed to a thickness approximately that required for the final structure and is not to be further compressed below this thickness during evacuation, which further compression might result in undesired deformation of the walls of the panel.

Figure 4:
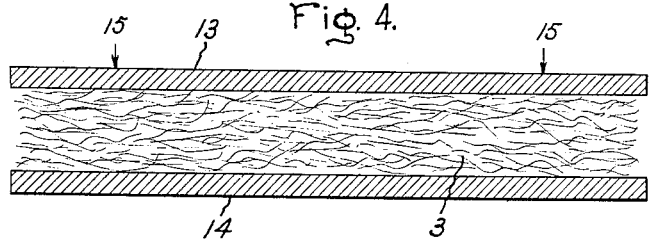
Fig. 4 illustrates diagrammatically another arrangement for making the filler material in accordance with my invention.

Alternatively, the batt of uncompressed filler material may merely be placed between two flat plates 13 and 14, as illustrated in Fig. 4, and a compressive force at least of the order of one atmosphere applied to these plates, as indicated at 15. When this method is employed, there is no positive bar to movement of some of the filaments laterally during the application of the compressive force. However, after the compressed batt has been heat treated in the manner described below and has been removed from the oven and the press, the edges thereof may be trimmed to the proper size for fitting within any panel in which the filler material is to be used, so that the possibility of loose filaments extending beyond the walls of the batt and into the weld area is minimized. This method, in which only two flat plates are employed and the enclosing container is omitted, is particularly applicable in situations where a relatively large batt of filler material, sufficient to provide filler material for several panels, is employed. After the large batt has been treated by the aforementioned method, it may then be cut into a number of pieces of the size necessary for each of the panels.

In order to retain the batt of filler material in the compressed state and to minimize its re-expansion, because of the resilience of the filaments, to a thicker condition after the pressure exerted on the plate 9 is removed, the batt of filler material in its compressed state is subjected to a temperature above the strain point but below the point at which any significant flow of the glass occurs. Preferably the temperature is chosen in the range between the strain point and the annealing point of the particular glass or other material employed, but temperatures slightly above the annealing point may be employed so long as temperatures high enough to result in significant flow of the glass are avoided. By way of example, in the case of borosilicate glass, such as that sold under the trade name "Fiberglas" and identified as "Type TWF," the strain point is 450° C. and the annealing point is 500° C. Subjecting the filler material to a temperature above the strain point slowly relieves the strains therein and allows the filaments to become set in the compressed condition. As indicated above, preferably the maximum temperature in treating this glass does not exceed 500° C. but, if it is desired to speed the operation, a somewhat higher temperature can be employed so long as the temperature is not sufficiently high to result in significant flow of the glass. It will be realized that any substantial increase in the temperature above the annealing point toward the softening point materially increases the tendency for flow of glass to occur and hence for some increase in the amount of contact area between adjacent filaments to result. Such increase in contact area, of course, increases the solid conduction of the filler material. The heating of the filler material in the manner described above may be accomplished by placing the material within a suitable oven while the application of the compressive force thereto is continued.

It will be realized that the time required for treating the filler material will vary widely depending on the temperature employed. This time also depends on the thickness of the batt of filler material being treated. The thicker the material, the longer is the time required for the heat to penetrate to the center thereof and to remove strains from the filaments in that region. In any event, the time of heat treatment should be sufficiently long that, with the temperatures employed, all of the filaments in the filler material are raised at least to the strain point. If sufficient time is available for treating the material, temperatures just above the strain point may be preferable since this offers the greatest assurance of minimizing softening of the glass and of minimizing increase in the contact area.

After the filler material has been subjected to the aforementioned temperature for the time necessary, the container 8 is removed from the oven and the filler material is allowed to cool. After the filler material has cooled to a temperature substantially below the strain point, the pressure exerted on the plate 9 is then removed and the batt of filler material is removed.

When a batt of filler material is treated in accordance with the method of this invention, there is some re-expansion of the batt of filler material after the compressive force is removed, but the thickness of the re-expanded batt of filler material is still only a small fraction of its original thickness. For example, were a batt four inches thick compressed to a thickness of, say, about ½" and treated in accordance with the method of this invention, the batt might re-expand to, say, about ⅝" when the compressive force is removed. Hence, when this batt is assembled in the panel shown in Fig. 1, for example, it extends only approximately ⅛" above the edges 4 of the lower wall 1, the depth of the wall 2 of the panel being approximately ½". During the final assembly of the panel walls, the batt must then be recompressed only about ⅛" to the approximately ½" final thickness to bring the edges 4 of the walls 1 and 2 into sealing engagement instead of the approximately 3½" compressive movement required where it is attempted to assemble an untreated batt in the panel. The walls are then welded at the edges to provide sealed envelope for the insulated structure. The force required to recompress the batt to its precompressed thickness is very small, being in the order of ⅕ pound per square inch. Unlike the situation illustrated in Fig. 2 in which an untreated batt is forced into the confines of the panel structure, there is little tendency for individual glass filaments of this treated batt to move laterally into the weld area between the edges 4 of the walls 1 and 2. This results from the fact that the filaments, in being subjected to heat while held under pressure, take a relatively permanent set in the compressed position and the deformation of the filaments and this resultant permanent set minimizes any tendency of the filaments to move laterally under the very small force exerted to recompress them to the thickness of the panel. Moreover, the compressing of the filler material within the container 8 during heat treatment or the trimming of the edges thereof after treatment in accordance with this invention substantially eliminates any loose ends of filaments extending beyond the side walls of the batt of filler material.

In the insulating structure of the aforementioned application of Strong and Bundy, it is important from the stand-point of minimum thermal conductivity that the glass filaments be oriented in planes extending in the general direction of the walls of the panel, that is, generally parallel to these walls in the usual insulating structure. Were uncompressed filler material of the type involved forced laterally into a confined space between the walls, it is unavoidable that a substantial number of the filaments, in this process, would be oriented in a direction normal to the walls, that is, in the direction of the heat flow between the walls. By precompressing the filler material and causing the filaments to set in the compressed form in accordance with the present invention, the tendency for filaments to be shifted from the desired orientation to a direction normal to the walls during the final assembly of the filler material within the walls is minimized.

While it has been previously suggested that batts of glass wool material be subjected to pressure and to elevated temperature for other purposes, the resultant structures would not be satisfactory for the purpose for which the applicant's filler material is proposed to be employed. In one previous disclosure, for example, only a mild pressure is employed, it being particularly required that the filler material have large spaces for permitting the passage of liquid therethrough. On the other hand, to provide a satisfactory filler material for use with insulated structures employing an evacuated space, it is necessary that a pressure of substantially one atmosphere or more be applied to the filler material, greatly compacting the material and causing it to assume a shape and thickness sufficient to support the walls against the differential pressure existing in the final insulated structure. It has also previously been suggested that batts of glass wool be subjected to elevated temperatures without the application of any pressure other than the weight of the material itself for the purpose of fusing and compacting the glass wool into a caked mass. In the method of my invention the temperature is specifically chosen to prevent such fusion, since the fusion of the filaments increases the solid conductivity and minimizes the effectiveness of the final insulating structure.

Figure 5:
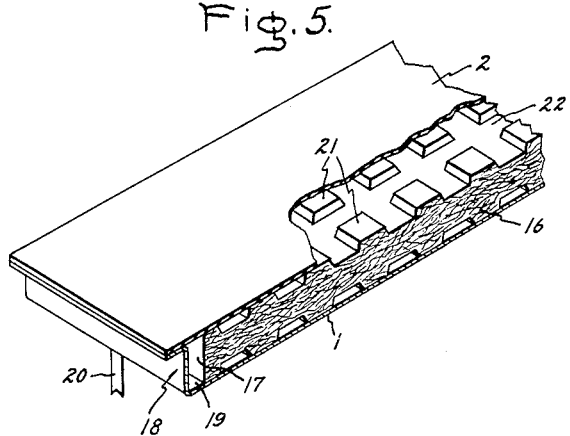
Fig. 5 shows a sectional view of a form of insulating structures embodying a modified form of my invention; and, Fig. 6 illustrates diagrammatically an arrangement for forming the filler material employed in the insulating structure of Fig. 5.
Figure 6:
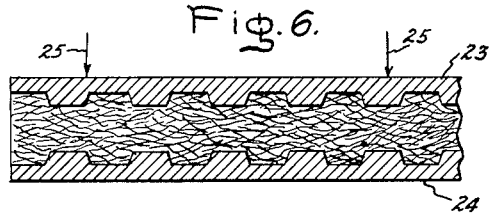

In addition to the use of the preforming process, that is the application of pressure and heat in the manner described above, for merely reducing the thickness of the batt of filler material, there may be combined with this treatment an arrangement for forming the surfaces of the filler material to facilitate evacuation. A modified form of my invention for accomplishing this additional result is illustrated in Figs. 5 and 6. Referring to Fig. 5, the insulating structure includes walls 1 and 2 as in the form previously described. The space between the walls 1 and 2 is filled with a filler material 16 which, as in the case of the filler material 3 of the form previously described, comprises a plurality of elongated glass filaments lying in a plurality of parallel planes and randomly oriented in these planes. At least one peripheral wall 17 of the filler material 16 is spaced from the corresponding peripheral portion 18 of the wall 1 to provide a passage 19 therebetween. The insulating structure is evacuated through a conduit 20 which is connected in communication with the passage 19. The conduit 20 is connected to a vacuum pump or other evacuating apparatus (not shown) for effecting evacuation of the insulating structure. The filler material 16 is formed to provide a deformation of each face thereof. In the specific form illustrated this deformation is shown as a waffle grid pattern including a plurality of projections 21 for engaging and supporting the walls 1 and 2. These supporting projections 21 provide a plurality of passages 22 therebetween. These passages 22 communicate with the passage 19. The provision of the waffle grid pattern and hence the passages 22 facilitates evacuation of the insulating structure by providing communication of the passage 19 and the conduit 20 with a large surface of the batt of filler material 16. In the absence of such passages, it would be necessary that gases evacuated from the filler material be drawn through the entire length or width of the filler material rather than merely through a portion of the thickness thereof, which is a much smaller dimension.

In accordance with my invention this waffle grid, or other suitable pattern, is conveniently formed simultaneously with the process of precompressing the batt of filler material in the manner described above. For accomplishing this result two dies or plates 23 and 24 are provided for engaging opposite faces of the batt of filler material 16. The uncompressed filler material is placed between the two dies 23 and 24 and pressure, as indicated diagrammatically by the arrows 25, is exerted on the upper die 23 to compress the batt of filler material in the manner described previously in connection with the forms of invention shown in Figs. 1 through 4. It can be seen because of the shape of the surfaces of the dies 23 and 24 the batt of filler material is, in addition to being compressed, deformed during the exertion of the compressive force to provide the waffle grid pattern on the surfaces thereof.

As in the forms previously described, the batt of filler material in its compressed state is subjected to a temperature above the strain point but below the point at which any significant flow of glass occurs. The suggested range of temperature previously discussed in connection with Figs. 1 through 4 applies equally well to the method of treatment illustrated in Fig. 6. As described previously, the heating of the filler material may be accomplished by placing the assembly within a suitable oven while the application of the compressive force to the filler material is continued. By the arrangement shown in Figs. 5 and 6 there is accomplished in a single operation the compression of the filler material to a reduced thickness to minimize the aforementioned difficulty concerning glass fibers in the weld area and at the same time the deformation of the surfaces of the filler material to provide passages for facilitating evacuation.

While, in the form of invention shown in Figs. 5 and 6, both surfaces have been illustrated as including a waffle grid pattern, it will be apparent that, if desired, one of the dies could use a flat surface so that only a single surface of the filler material is deformed in the manner described. Additionally, while a specific pattern, namely a waffle grid pattern, has been employed for purposes of illustration, it will be apparent that any other pattern providing passages for movement of gases along one or both surfaces of the filler material between the filler material and the corresponding wall of the sealed envelope could be utilized.

While I have shown and described specific embodiments of my invention particularly suitable for use with vacuum insulated structures, I do not desire my invention to be limited to the particular details shown and described and I intend, by the appended claims, to cover all modifications within the spirit and scope of my invention.

What I claim as new and desire to secure by Letters Patent of the United States is:

1. A method of manufacturing an evacuated insulating structure which comprises providing a first wall and a second pan-shaped wall of predetermined depth including a central portion and a rim extending toward said first wall for spacing said first wall from said central portion of said second wall, providing a batt of filler material of a thickness greatly exceeding the depth of said second wall, said batt filler material consisting of a plurality of elongated glass filaments, applying a force at least of the order of one atmosphere to compress said batt to a thickness substantially equal to the depth of said second wall, and, while said force is applied, heating said batt to a temperature above the strain point of the glass filaments and below the temperature at which any softening and flow of the glass occurs to cause said batt to substantially retain its compressed form after said force is removed, cooling said batt to a temperature substantially below said strain point before removing said force, assembling said compressed batt in said pan-shaped second wall, bringing said first wall into engagement with said second wall to enclose said batt, welding said first wall to said second wall to seal said structure, and evacuating said sealed structure to a pressure of the order of 100 microns of mercury.

2. The method of claim 1 in which said batt consists of borosilicate glass filaments and the compressed batt is heated to a temperature of from 450° to 500° C. for a period of from five to fifteen minutes to cause said batt to retain its compressed form after the compressing force is removed.

References Cited in the file of this patent

UNITED STATES PATENTS

| | | |
|---|---|---|
| 1,186,572 | Guibert | June 13, 1916 |
| 1,888,166 | Geipel | Nov. 15, 1932 |
| 1,898,977 | Comstock | Feb. 21, 1933 |
| 2,023,354 | Cope | Dec. 3, 1935 |
| 2,253,384 | Lown | Aug. 19, 1941 |
| 2,263,217 | Lillie et al. | Nov. 18, 1941 |
| 2,271,829 | Powers | Feb. 3, 1942 |
| 2,565,941 | Barnard | Aug. 28, 1951 |

FOREIGN PATENTS

| | | |
|---|---|---|
| 137,781 | Austria | May 25, 1934 |
| 475,464 | Great Britain | Nov. 19, 1937 |